United States Patent [19]

Suzuki

[11] 3,976,263
[45] Aug. 24, 1976

[54] OPERATING SYSTEM IN A MAGNETIC TAPE REPRODUCER AND RECORDER

[75] Inventor: Nobuo Suzuki, Sagamihara, Japan

[73] Assignee: Technical Incorporated, Japan

[22] Filed: Oct. 29, 1974

[21] Appl. No.: 518,968

[52] U.S. Cl. ............................. 242/201; 242/209
[51] Int. Cl.² .................. G03B 1/04; G11B 15/32
[58] Field of Search ................... 242/201–206, 242/208, 209, 192; 360/73

[56] References Cited
UNITED STATES PATENTS

| | | | |
|---|---|---|---|
| 3,582,013 | 6/1971 | Beretta | 242/186 |
| 3,608,845 | 9/1971 | Kozv et al. | 242/186 |
| 3,697,015 | 10/1972 | Iwata | 242/186 |

*Primary Examiner*—Leonard D. Christian
*Attorney, Agent, or Firm*—Hill, Gross, Simpson, Van Santen, Steadman, Chiara & Simpson

[57] ABSTRACT

A magnetic tape machine wherein the switch-over operations of the machine are driven by the tape driving mechanism so as to allow a single drive motor to drive the tape as well as to provide power for switch-over operations. A starting plate is pivotally attached to the tape machine and a moving plate is mounted adjacent the starting plate with a first gear rotatably mounted on the tape machine and having a pair of cutout portions displaced 180° from each other and a second gear and capstan driven by the main motor with the second gear engageable with the first gear to drive it 180° each time the first and second gears engage such that the various plates, gears and idlers allow the single drive motor to drive the tape as well as to provide power for switch over operations.

5 Claims, 4 Drawing Figures

OPERATING SYSTEM IN A MAGNETIC TAPE REPRODUCER AND RECORDER

BACKGROUND OF THE INVENTION

1. Field of the Invention

This invention relates in general to magnetic tape reproducers and recorders and in particular to a compact magnetic reproducer and recorder utilizing push button control mechanisms.

2. Description of the Prior Art

Magnetic tape reproducers and recorders are known which are operated by lever handles and by push buttons. Most of these utilized switch-over systems wherein the internal operating mechanisms are moved by external manual force. However, some machines require substantial manual force to operate the mechanism.

Soft-touch operating systems have been developed which utilize push button type operation and in such system electrical circuit switching means are energized by push buttons so as to supply current to electro magnetic means which operate the internal mechanism. Such push button systems are an improvement over the simple manual systems in that a great deal of manual force is not required by the operator but at the same time such electro magnetic operated systems result in substantial complication of the mechanisms and the many additional components thus rendering the tape machines bulky and expensive and result in substantial increase in power consumption by the machine.

SUMMARY OF THE INVENTION

The present invention relates to a tape machine which utilizes soft-touch operation wherein the driving power of the motor for the magnetic tape machine is utilized to provide power for the switch-over mechanism of the internal mechanism and thus eliminating the electro magnets of conventional soft-touch operating systems.

In the present invention the control buttons for providing different operating modes of the machine provide engagement with the mechanism driven by the main motor of the machine which drives the reels during normal playback and record such that power for switching to different modes is supplied with idler pulleys to provide switch-over operation.

Movable plates and a gear are utilized with a pair of idler pulleys for engaging the driving pulley and the two reel shafts.

Other objects, features and advantages of the invention will be readily apparent from the following description of certain preferred embodiments thereof, taken in conjuction with the accompanying drawings, although variations and modifications may be effected without departing from the spirit and scope of the novel concepts of the disclosure, and in which:

DESCRIPTION OF THE PREFERRED EMBODIMENTS

Figure 1:
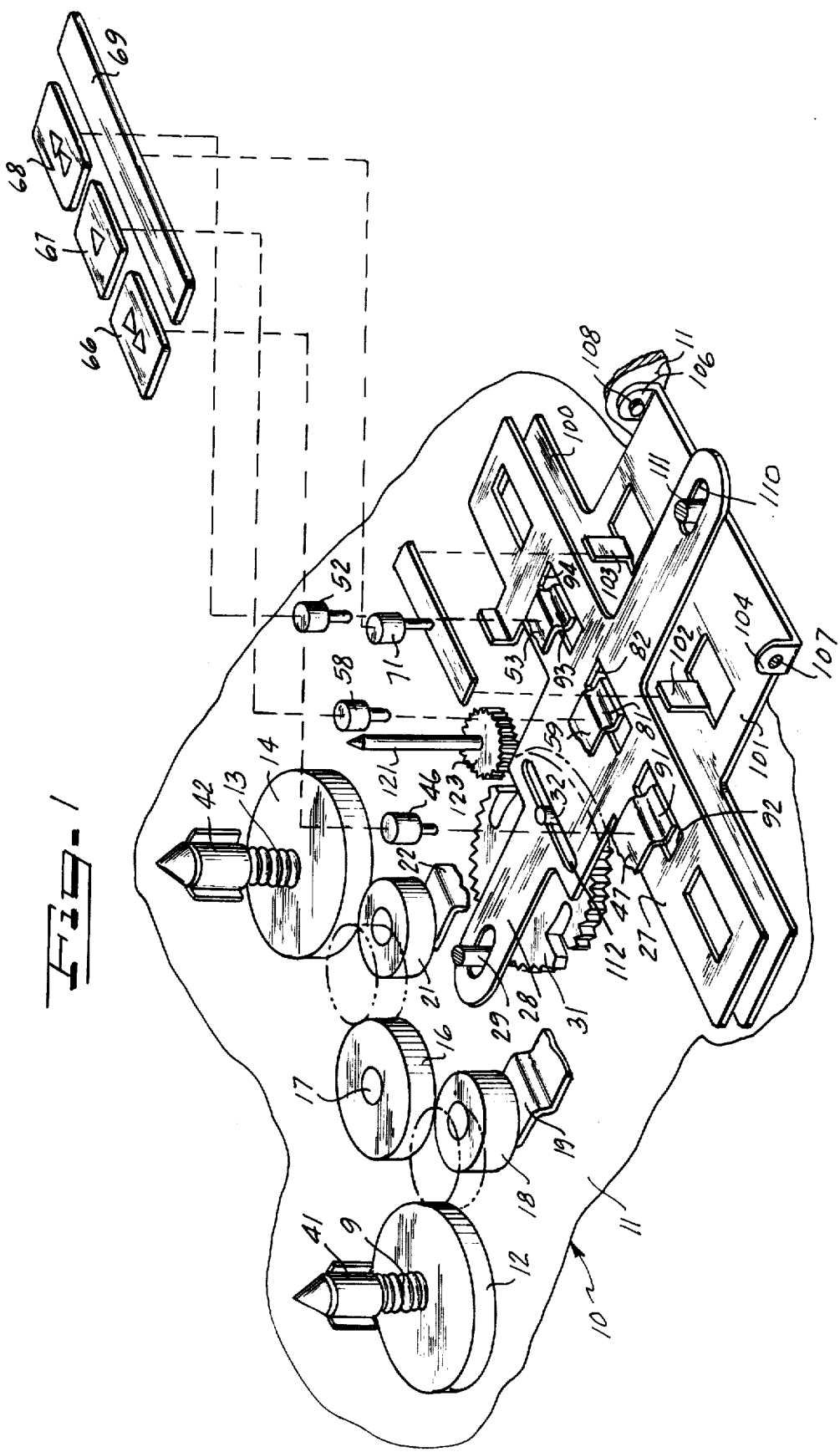
FIG. 1 is a cut-away perspective view of the operating system of the invention.

FIG. 1 illustrates the internal mechanism of a tape recorder 10 which comprises a frame member of the tape machine 11 which rotably supports shafts 9 and 13 which respectively carry reel shaft wheels 12 and 14 and tape reel engaging mechanisms 41 and 42 upon which the reels of the tape are mounted.

Figure 4:
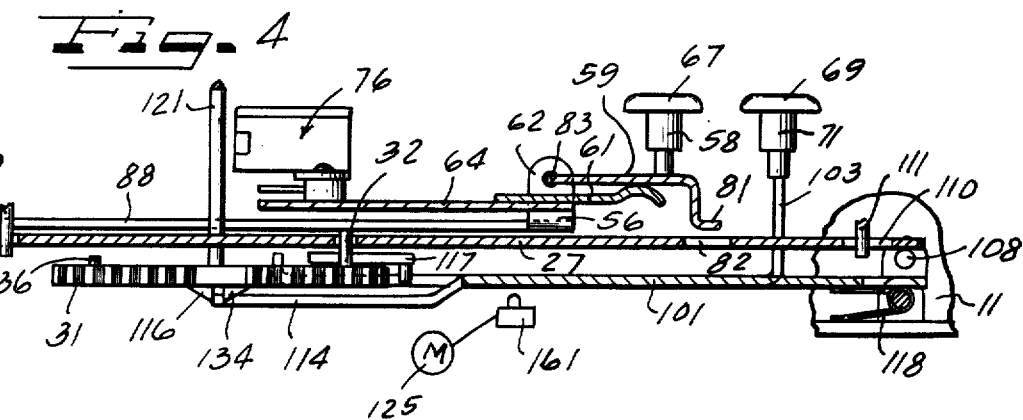
FIG. 4 is a sectional view illustrating the invention.

The machine includes an operating pin 58 which is depressed by a operating key 67, a fast forward pin 52 which is actuated by a finger key 68, a rewind pin 46 which is actuated by a rewind key 66 and a stop pin 71 which is actuated by a stop key 69. Light pressure on any of the finger keys 66 through 69 will in turn depress the corresponding pins 46, 58, 52 and 71. A locking lever 59 has a locking portion 81 which passes through an opening 82 in a moving plate 27 to contact a starting plate 101 and the other end of the locking lever 59 is rotatably supported by a bracket 83 which is attached to a plate 64 as best shown in FIG. 4. When the key 67 is depressed the locking lever 59 has its portion 81 moved into the opening 82 of the moving plate 27 and contacts starting plate 101.

Figure 2:
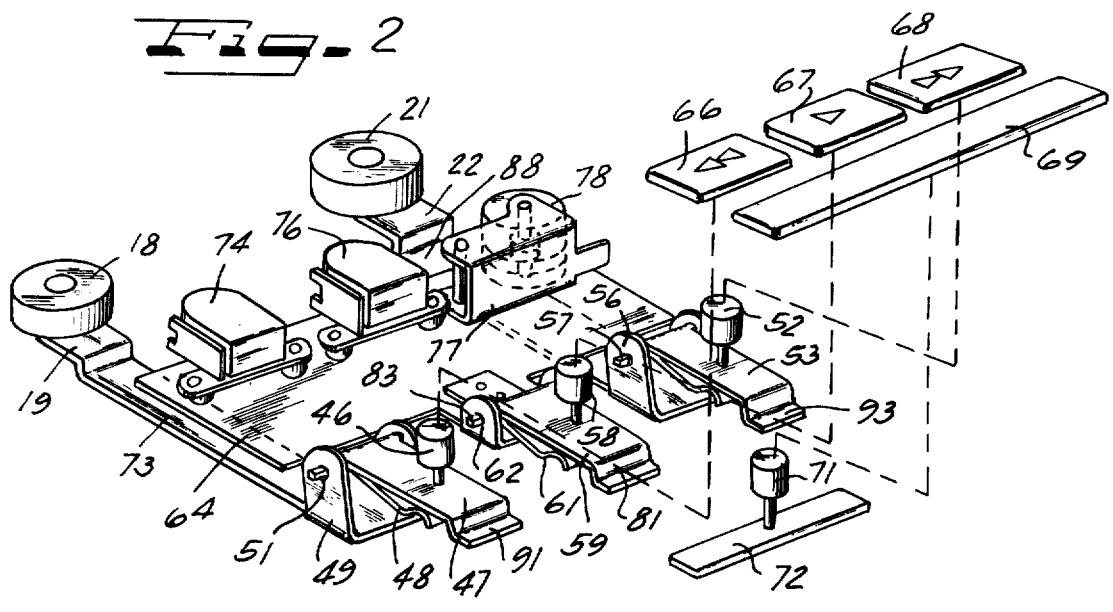
FIG. 2 is a cut-away perspective view of the invention.
Figure 3:
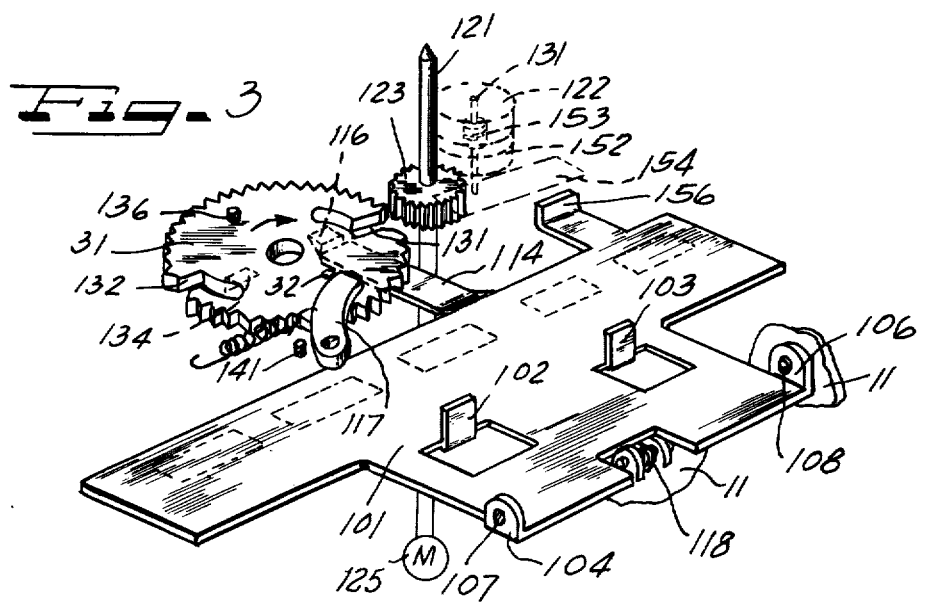
FIG. 3 is a perspective view showing greater detail of the operating mechanism of the invention.

The rewind pin 46 engages a locking lever 47 which has a locking portion 91 receivable in opening 92 in plate 27. The pin fast forward 52 engages the locking lever 53 which has a locking portion 93 which is receivable in opening 94 of moving plate 27 as shown in FIG. 1. As best shown in FIG. 2 the locking levers 47 and 53 are rotatably supported on brackets 49 and 56 by shafts 51 and 57 which are mounted on plates 88 and 73. as shown in FIG. 2. The idlers 18 and 21 are mounted on extensions 19 and 22 of plates 73 and 88. As shown in FIG. 3 a starting plate 101 has a pair of projections 102 and 103 which are depressed by the stop key 69 through an intermediate plate 72. If desired, the projections 102 and 103 may extend higher so that they are directly pressed by the stop key 69.

The starting plate 101 is pivotally attached by the brackets 104 and 106 and shafts 107 and 108 to the fixed main frame 11 of the machine and the plate 101 rotates about the shafts 107 and 108. One end of the moving plate 27 is formed with a groove 110 and a pin 111 extends there through which is attached to the plate 101 so as to allow plate 27 to move forward and backward relative to FIGS. 1 and 4. A transverse groove 112 is formed in an intermediate portion of plate 27 and a pin 32 which is attached to gear 31 is received in the groove 112 such that as the gear 31 rotates the plate 27 will move forwardly and backwardly relative to FIGS. 1 and 4. The idler wheel 21 is movable to a position where it engages the driving pulley 16 and the reel shaft pulley 14 so as to drive the reel mounted on the reel shaft 13 for fast forward operation. The idler 18 is movable to engage the driving pulley 16 and the reel shaft wheel 12 so as to drive the reel shaft 9 for rewinding operation.

The relationship between the gear 31 and the plate 101 is such that the forward end 114 engages a locking projection 116 mounted on gear 31 as best shown in FIG. 3. This is because the gear 31 is always driven by a pawl 117 so that it rotates in a clockwise direction as shown by the arrow in FIG. 3 and when the projection 116 engages the end of the extension 114 the gear 31 cannot rotate. However, since the plate 101 is pivoted on shafts 107 and 108 and is spring biased by a spring 118 mounted on the frame 11 to the up position, when the plate 101 is depressed downwardly the projection 114 disengages with the projection 116 so that the gear 31 can be rotated. A motor 125 is turned on by a switch 161 actuated by the plate 101 and the motor drives a capstan shaft 121 and a gear 123. The gear 31 is caused to rotate by the action of the pawl 117.

As the gear 31 rotates it moves such that gear teeth adjacent the notched portion 131 engage the teeth of gear 123 and as a result the gear 31 is caused to rotate until it makes one-half of a rotation where the second notch 132 is adjacent to gear 123 where another stopper projection 134 engages the end 114 and a pin 136 engages the pawl 117. The pin 136 is shorter than the pin 32 so that the rotation of the pin 136 will not be prevented by the moving plate 27 which is mounted on the gear 31 and does not pass over the forward end of the pawl 117 which is in engagement with a stop 141.

When the gear 31 turns one-half of a rotation the pin 32 moves from the position shown in FIG. 3 to a position exactly opposite and as a result the plate 27 and its lateral groove 112 in which the pin 32 is loosely mounted will be urged to move toward the upper left relative to FIG. 1.

As will be understood from the cross-sectional view of FIG. 4 when the operating key 67 is depressed so as to push the operating pin 58 down the locking member 59 and locking end 81 will be depressed through the opening 82 of the moving plate 27 so as to contact the starting plate 101 and energize the motor and gear 31 for operation. The locking end 81 of the locking lever 59 will be locked at the edge of the opening 82 and pushed as the moving plate 27 moves. Thus the magnetic head mounting plate 64 which carries the magnetic head 76 will move upward toward the upper left relative to FIG. 2 so as to place the magnetic heads 74 and 76 and a pinch roller 21 in the normal driving position.

Likewise when the keys 68 and 66 are respectively operated the locking levers 53 and 47 will urge the plate 101 downward and will be driven by the moving plate 27 so as to move the linkage 73 or 88 as to respectively engage the idlers 18 or 21 for either fast forward or rewind operation.

When the stop key 69 is depressed it presses down on the starting plate 101 directly or through the linkage 103 and pin stop 71 and this causes the forward end of the locking lever 114 of plate 101 to disengage the locking projections 116 or 134 and allows the gear 31 to make a half revolution. As gear 31 turns the pin 32 returns to its original position shown in FIG. 1 whereby the moving plate 27 is also restored to its original position. The restoration of the moving plate 27 draws the blocking levers 59, 47 and 53 from the openings 82 and the associated openings where the other locking holes allows them to be released from the engaging position. Thus all of the operating mechanisms return to the original condition and operation of the machine ceases.

Pinch roller 122 engages the capstan shaft 121 and is carried by a shaft 151. A second pinch roller 152 is mounted on the same shaft 151 and it rotates integrally with the roller 122 and is connected therewith with a cam clutch mechanism 153. Both rollers 122 and 152 are in engagement with the capstan shaft 121. The pinch roller 122 presses the magnetic tape against capstan shaft 121 doing driving operations of the magnetic tape. Since the end of the tape is fixed to a reel in a cassette type holder when the tape reaches the end of the reel further movement of the tape is prevented and the tape will slip against the capstan shaft 121. The pinch roller 122 will stop rotation due to stopping of the tape and the coaxial roller 152 will continue to rotate since it is in direct contact with the capstan shaft 121. Thus the roller 122 is stationary and the roller 152 is turning. This difference in rotation disengages the cam clutch mechanism 153 which in turn has its cam surface depress the coaxial roller 152 axially downwardly and this downward movement of the coaxial roller 152 is transmitted to an intermediate sheet spring 154 through a mechanical transmission member as, for example, the cylindrical cover which surrounds the shaft 151. Upon depression the sheet spring 154 presses the end of another lever 156 which extends from the starting plate 101 which causes the starting plate 101 to disengage itself from the gear 31 which initiates stopping operation as discussed above when the stopping key is depressed and hence all the operating mechanisms are restored to their original state. In this situation restoration to the original state is done automatically at the end of the tape.

It is seen that this invention allows control of the tape driving mechanism by merely touching the keys and touch plates with very little force and the power of the tape driving motor is utilized as the driving power for switching over the tape mechanism to different modes. The invention provides simple and easy operation and does not require additional electro magnetic means which are required in conventional soft-touch operating systems. Thus the invention can be compact and does not require the additional mechanisms of prior art soft-touch machines.

Although in this invention the embodiment shows coupling means arranged between the touch plates and the locking plates respectively, it is to be realized that variations and modification of the device are available such as mechanisms for preventing the simultaneous actuation of two or more of the touch plates are a double operation preventive mechanism and a mechanism for deciding the order of sequential operations can be provided.

Although the invention has been described with respect to preferred embodiments it is not to be so limited as changes of modifications may be made therein which are within the full intended scope as defined by the appended claims.

I claim as my invention:

1. A tape machine having record-playback, fast forward and rewind modes and a main driving motor for moving the tape comprising means for utilizing the main driving motor for providing the power between modes incuding a starting plate pivotally attached to the tape machine, a moving plate mounted adjacent said starting plate, a first gear rotatably mounted on said tape machine and having a pair of cut out portions displaced 180° from each other, a second gear and capstan driven by said main motor engageable with said first gear to drive it 180° each time the first and second gears engage, a pair of stops formed on said first gear and engageable with a portion of said starting plate, a transverse slot formed in said moving plate, a first pin formed on said first gear and receivable in said transverse slot to move said moving plate, a second pin formed on said first gear, a spring loaded lever means in contact with said first pin to cause said first gear to rotate when said portion of the starting plate is released from engagement with one of said stops, a pair of reel pulleys mounted on said machine, a driving pulley, a first idler roller moveable to a position engageable with said driving pulley and one of said reel pulleys to operate in the rewind mode, a first moveable member connected to said first idler roller, rewind button means actuating said first moveable member to engage said moving plate, a second moveable member connected to said second idler roller, fast forward button means actuating said second moveable member to engage said moving plate, a magnetic head bracket, an operating button means actuating said magnetic head bracket to engage said moving plate, and a stop button means actuating said starting plate.

2. A tape machine according to claim 1 including a tape driving pinch roll engageable with said tape and said capstan to drive it, a second pinch roll engageable with said capstan, and a clutch mounted between said first and second pinch rolls, and actuating means connected between said clutch and said starting plate to actuate the starting plate to stop the machine when the tape reaches the end of a reel.

3. A tape machine adapted for soft-touch push key operation comprising:
   a. operating key means;
   b. stop key means;
   c. a hinged starting plate actuated by said stop key means and said operating key means;
   d. a moving plate adjacent said hinged starting plate and having apertures therein;
   e. tape reel means having a tape;
   f. idler means engageable with said tape reel means for winding and rewinding having a locking element engageable through said moving plate apertures to activate said starting plate below said apertures and to lock in said apertures when said locking element is engaged by said operating key means;
   g. tape pickup and driving means engageable with said tape having a locking element engageable through said moving plate apertures to activate said starting plate below said aperture and to lock in said apertures when said locking element is engaged by said operating key means;
   h. a control gear having means for connecting said control gear to said moving plate to cause said plate to translate, a pair of locking means on said control gear engageable with said starting plate, and a pair of cut out portions displaced 180° from each other.
   i. a motor driven gear engageable with said control gear; and
   j. a lever means engageable with said control gear, whereby a touch of said operating key means depresses said idler means and tape pickup and driving means locking element to cause said element to engage said starting plate through said moving plate apertures and lock therein, said starting plate disengaging from said control gear locking projection, and said control gear rotating by said lever means until engagement by said motor driven gear, said control gear causing said moving plate to translate.

4. The tape machine of claim 3 in which said operating key means comprises fast-forward, operating, and rewind keys and said idler means comprises first and second idler rollers for winding and rewinding, respectively.

5. The tape machine of claim 3 in which said tape pickup and driving means has first and second coaxial pinch rollers with a cammed clutch therebetween for moving said second pinch roller into contact with an arm portion of said starting plate.

\* \* \* \* \*